United States Patent
Oyabu

(10) Patent No.: US 8,472,939 B2
(45) Date of Patent: Jun. 25, 2013

(54) COMMUNICATION METHOD AND CONTROL APPARATUS, BASE STATION APPARATUSES AND TERMINAL APPARATUS USING THE COMMUNICATION METHOD

(75) Inventor: Takahiro Oyabu, Gifu (JP)

(73) Assignee: Kyocera Corporation, Kyoto (JP)

( * ) Notice: Subject to any disclaimer, the term of this patent is extended or adjusted under 35 U.S.C. 154(b) by 414 days.

(21) Appl. No.: 12/740,344

(22) PCT Filed: Oct. 31, 2008

(86) PCT No.: PCT/JP2008/003129
§ 371 (c)(1),
(2), (4) Date: Aug. 6, 2010

(87) PCT Pub. No.: WO2009/057316
PCT Pub. Date: May 7, 2009

(65) Prior Publication Data
US 2010/0297992 A1    Nov. 25, 2010

(30) Foreign Application Priority Data

Oct. 31, 2007   (JP) ................................. 2007-282844

(51) Int. Cl.
*H04W 4/00* (2009.01)
(52) U.S. Cl.
USPC ........ 455/422.1; 455/515; 455/450; 455/561; 370/310; 370/329; 370/341
(58) Field of Classification Search
USPC ................. 370/328, 329, 341, 346, 449, 468, 370/310; 455/422.1, 450, 451, 452.1, 452.2, 455/507, 509, 510, 515
See application file for complete search history.

(56) References Cited

U.S. PATENT DOCUMENTS

| 2003/0076804 | A1 | 4/2003 | Sivalingham |
| 2004/0082337 | A1* | 4/2004 | Lacroix et al. ................ 455/450 |

(Continued)

FOREIGN PATENT DOCUMENTS

| JP | 07-184250 | 7/1995 |
| JP | 09-233538 | 9/1997 |

(Continued)

OTHER PUBLICATIONS

Notification of Reason(s) for Refusal (translation) for JP 2007-282844, mailed Apr. 17, 2012, 2 pages.

(Continued)

*Primary Examiner* — Ajit Patel
(74) *Attorney, Agent, or Firm* — Duane Morris LLP

(57) ABSTRACT

A first interface unit receives an incoming signal notification addressed to a terminal apparatus. A generator generates a first message used to have the received incoming signal notification in a paging channel. A second interface unit outputs the generated first message to a base station apparatus corresponding to a paging area of the terminal apparatus. The first interface unit receives, from the base station apparatus, connection information indicating that a communication channel for data communication is established between the terminal apparatus and the base station apparatus. When the connection information is received, the generator generates a second message used to have the incoming signal notification included in the communication channel. The second interface unit outputs the generated second message to the base station apparatus that has established the communication channel with the terminal.

7 Claims, 10 Drawing Sheets

U.S. PATENT DOCUMENTS

| | | | | |
|---|---|---|---|---|
| 2005/0180325 A1* | 8/2005 | Niemela et al. | ............... | 370/230 |
| 2005/0221839 A1* | 10/2005 | Chan et al. | .................... | 455/453 |
| 2008/0026766 A1* | 1/2008 | Shin | .............................. | 455/450 |
| 2008/0165744 A1* | 7/2008 | Forssell | ........................ | 370/336 |

FOREIGN PATENT DOCUMENTS

| | | |
|---|---|---|
| JP | 2002-125260 | 4/2002 |
| JP | 2005-506802 | 3/2005 |
| WO | WO-03/036883 | 5/2003 |

OTHER PUBLICATIONS

International Search Report for PCT/JP2008/003129, mailed on Feb. 3, 2009, 1 page.

International Preliminary Report on Patentability for PCT/JP2008/003129, 5 pages, issued Jun. 1, 2010.

* cited by examiner

US 8,472,939 B2

COMMUNICATION METHOD AND CONTROL APPARATUS, BASE STATION APPARATUSES AND TERMINAL APPARATUS USING THE COMMUNICATION METHOD

CROSS-REFERENCE TO RELATED APPLICATIONS

This is a U.S. National Phase Application of International Application No. PCT/JP2008/003129 filed Oct. 31, 2008, which claims priority to Japanese Patent Application No. 2007-282844 filed Oct. 31, 2007, the disclosures of which are incorporated herein by reference in their entirety.

BACKGROUND OF THE INVENTION

1. Technical Field

The present invention relates to a communication technique, and it particularly relates to a communication method for conveying an incoming call or signal to a terminal apparatus, and a control apparatus, base station apparatuses and a terminal apparatus utilizing said communication method.

2. Background Technology

In a wireless communication system, communications using a terminal apparatus are enabled when the terminal apparatus is connected to a base station apparatus. Where the terminal apparatus is equipped with a function to allow verbal communications or telephone calls, a position is registered in the wireless communication system to allow the terminal apparatus to receive incoming calls or signals. To register the position, a plurality of base station apparatuses are grouped into groups, thereby forming radio zones. In this formation of radio zones, correspondence relations between terminal apparatuses and the radio zones in which the respective terminal apparatuses are located are stored. Also, when an incoming signal notification arrives at a terminal apparatus, access or call is made to the terminal from all of the base station apparatuses belonging to a particular zone (See Patent Document 1, for instance).

[Patent Document 1] Japanese Patent Publication No. Hei07-184250.

DISCLOSURE OF THE INVENTION

Problems to be Solved by the Invention

The terminal apparatus, which has received a call (access), transmits a request for allocation of channels (hereinafter referred to as "allocation request" or "request for allocation") to a base station apparatus, and the allocation of a channel by the base station apparatus allows verbal communications through the terminal apparatus. In this manner, though the terminal apparatus is finally connected to a single base station apparatus, the call or access is transmitted from a plurality of base station apparatuses. In wireless communication, it is generally desired that the limited frequency resources be used effectively. Thus the improved effective use of frequency is also desired when access or call is made. Also, a simultaneous paging channel for calls (hereinafter referred to as "PCH (paging channel)" is transmitted in a predetermined cycle. Accordingly, the length of time before the subsequent transmission of PCH may be very long depending on the timing of an incoming signal notification.

The present invention has been made in view of such circumstances and a purpose thereof is to provide a communication technique by which to promptly convey a call or access to a terminal apparatus while the frequency usage efficiency is improved.

Means for Solving the Problems

In order to resolve the above problems, a control apparatus according to one embodiment of the present invention comprises: an input unit configured to receive an incoming signal notification addressed to a terminal apparatus; a generator configured to generate a first message used to have the incoming signal notification received by the input unit included in a paging channel; and an output unit configured to output the first message generated by the generator to a base station apparatus corresponding to a paging area of the terminal apparatus. The input unit receives, from the base station apparatus, connection information indicating that a communication channel for data communication is established between the terminal apparatus and the base station apparatus; when the connection information is received, the generator generates a second message used to have the incoming signal notification included in the communication channel; and the output unit outputs the second message generated by the generator, to the base station apparatus which establishes the communication channel with the terminal.

Another embodiment of the present invention relates to a base station apparatus. This apparatus comprises: an input unit configured to receive an incoming signal notification addressed to a terminal apparatus; a transmitter configured to have the incoming signal notification received by the input unit included in a paging channel and configured to transmit the paging channel; a receiver configured to receive a response to the paging channel transmitted by the transmitter, from the terminal apparatus, the response corresponding to a request for allocation of a call communication channel; and a control unit configured to allocate the call communication channel to the terminal apparatus, based on the response received by the receiver. When the control unit allocates a data communication channel to the transmitter, the transmitter has the incoming signal notification included in the data communication channel and transmits the data communication channel to the terminal apparatus; the receiver receives a response to the data communication channel transmitted by the transmitter, from the terminal apparatus, the response corresponding to a request for allocation of the call communication channel.

Still another embodiment of the present invention relates to a terminal apparatus. This apparatus comprises: a receiver configured to receive a paging channel containing an incoming signal notification from a base station apparatus; a request unit configured to transmit a response to the paging channel received by the receiver, to the base station apparatus, the response corresponding to a call communication channel; and a communication unit configured to perform communication with the base station using the call communication channel allocated by the base station apparatus to which the request unit has transmitted the response. When a data communication channel is assigned from the receiving unit, the receiver receives the data communication channel containing the incoming signal notification from the base station apparatus; the request unit transmits a response to the data communication channel received by the receiver, to the base station apparatus, the response corresponding to a request for allocation of the call communication channel.

Still another embodiment of the present invention relates to a communication method. This method comprises: receiving an incoming signal notification addressed to a terminal apparatus; generating a first message used to have the incoming signal notification received by the receiving included in a paging channel; and outputting the first message generated by the generating to a base station apparatus corresponding to a paging area of the terminal apparatus. When connection information indicating that a communication channel for data communication is established between the terminal apparatus and the base station apparatus is received from the base station apparatus, the generating is such that a second message used to have the incoming signal notification included in the communication channel is generated; the outputting is such that the generated second message is outputted to the base station apparatus which establishes the communication channel with the terminal.

Still another embodiment of the present invention relates also to a communication method. This method comprises: receiving an incoming signal notification addressed to a terminal apparatus; having the received incoming signal notification included in a paging channel and transmitting the paging channel; receiving a response to the transmitted paging channel, from the terminal apparatus, the response corresponding to a request for allocation of a call communication channel; and allocating the call communication channel to the terminal apparatus, based on the received response. When a data communication channel is assigned to the terminal apparatus, the transmitting is such that the incoming signal notification is included in the data communication channel and the data communication channel is transmitted to the terminal apparatus; the receiving is such that a response to the transmitted data communication channel is received from the terminal apparatus, the response corresponding to a request for allocation of the call communication channel.

Still another embodiment of the present invention relates also to a communication method. This method comprises: receiving a paging channel containing an incoming signal notification, from a base station apparatus; transmitting a response to the received paging channel, to the base station apparatus, the response corresponding to a request for allocation of a call communication channel; and performing communication with the base station apparatus by using the communication channel allocated by the base station apparatus which has transmitted the response. When a data communication channel is assigned from the base station apparatus, the receiving is such that the data communication channel containing the incoming signal notification is received from the base station apparatus; the transmitting is such that a response to the received data communication channel is transmitted to the base station apparatus, the response corresponding to a request for allocation of the call communication channel.

Optional combinations of the aforementioned constituting elements, and implementations of the invention in the form of methods, apparatuses, systems, recording mediums, computer programs and so forth may also be effective as additional modes of the present invention.

Effect of the Invention

The present invention promptly conveys a call or access to a terminal apparatus while frequency usage efficiency is improved.

DESCRIPTION OF THE REFERENCE NUMERALS

Figure 1:
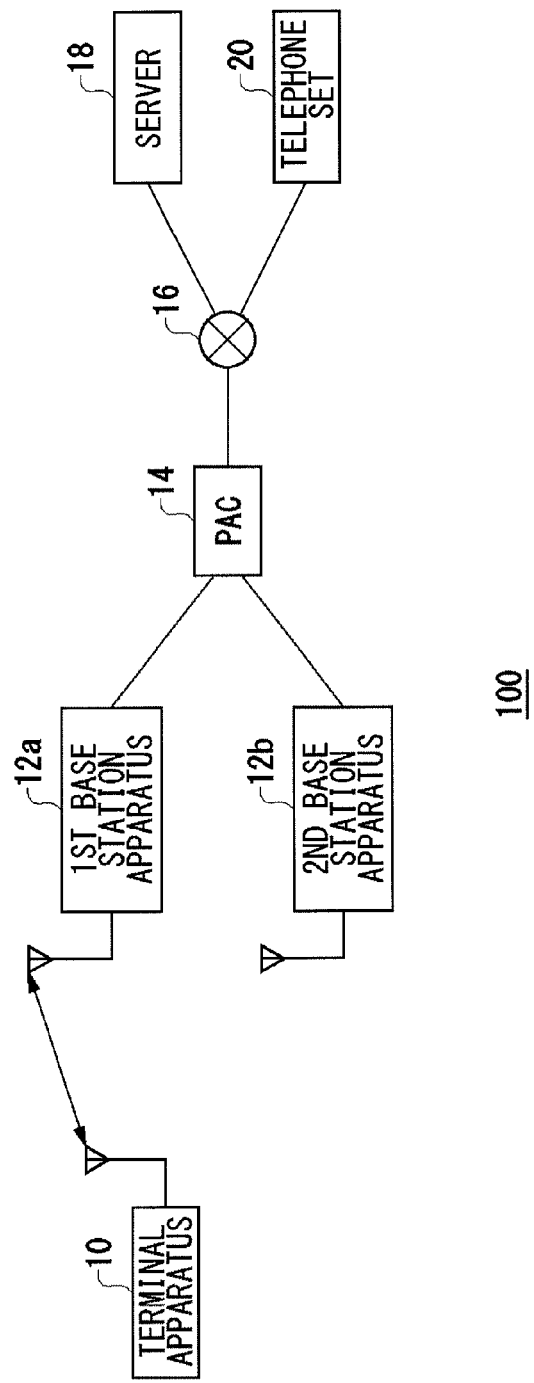
FIG. 1 shows a structure of a communication system according to an exemplary embodiment of the present invention.

10 Terminal apparatus
12 Base station apparatus
14 PAC
16 Network
18 Server
20 Telephone set
30 First interface unit
32 Second interface unit
34 Storage
36 Decision unit
38 Generator
40 Control unit
50 Radio unit
52 Interface unit
54 Storage
56 Decision unit
58 Generator
60 Control unit
70 Radio unit
72 Processing unit
74 Interface unit
76 Storage
78 Decision unit
80 Analyzing unit
82 Control unit
100 Communication system

BEST MODE FOR CARRYING OUT THE INVENTION

An outline of the present invention will be given before a specific description thereof. Exemplary embodiments of the present invention relate to a communication system comprised of a plurality of base station apparatuses, a terminal apparatus and a PAC (Paging Area Controller). A plurality of base station apparatuses are connected to the PAC, thereby forming a paging area. As the terminal apparatus gets connected to a base station apparatus, the position of this terminal apparatus is registered by the PAC. Also, as the PAC receives an incoming signal notification sent to said terminal apparatus, the PAC conveys, to the plurality of base station apparatuses, an instruction by which to have the incoming signal notification included in a PCH (hereinafter this instruction will be referred to as "PCH incoming signal message").

Each of the plurality of base station apparatuses broadcasts the PCH containing the incoming signal notification, thereby accessing or making call to the terminal apparatus. In other words, PCHs are also transmitted from base station apparatuses to which the terminal apparatus is not connected, so that further efficient use of frequency is desired. Note that the terminal apparatus has not only a function of performing calls or voice communications but also a function of performing data communications. The base station apparatus assigns a communication channel for performing calls (hereinafter referred to as "call communication channel") in the former case and assigns a communication channel for data communications (hereinafter referred to as "data communication channel") in the latter case. The communication system according to the present exemplary embodiment performs the following processings to enhance the frequency use efficiency.

If data communication is in progress between the terminal apparatus and the base station apparatus, namely if a data communication channel is assigned, the base station apparatus will inform the base station apparatus accordingly. As the PAC receives the incoming signal notification addressed to the terminal apparatus, the PAC will convey an instruction by which to have the incoming signal notification included in the data communication channel (hereinafter referred to as "communication channel incoming signal message"). The base station apparatus makes a call to the terminal apparatus by transmitting the data communication channel containing the incoming signal notification thereto. As the terminal apparatus acquires the incoming signal notification containing the data communication channel, the terminal apparatus transmits a request for allocation of a call communication channel. With the call communication channel assigned by the base station apparatus, the terminal apparatus enables the call.

FIG. 1 shows a structure of a communication system 100 according to an exemplary embodiment of the present invention. The communication system 100 includes a terminal apparatus 10, a first base station apparatus 12a and a second base station apparatus 12b, which are generically referred to as "base station apparatus 12", a PAC 14, a network 16, a server 18, and a telephone set 20. The terminal apparatus 10 is a radio equipment compatible with a predetermined wireless scheme. It is to be noted herein that the terminal apparatus 10 has not only a function of performing calls or voice communications but also a function of performing data communications. The data communication meant here may be the transmission and receiving of electronic mails, the browsing of the world wide web (WWW) and voice over Internet protocol (VoIP), for instance. Also, such processings may be achieved by the terminal apparatus 10 alone or through a connection via a personal computer (PC).

One end of each base station apparatus 12 is connected to the terminal apparatus 10 via radio communication, while the other end thereof is connected to the PAC 14 via wire communication. The base station apparatus 12 is connected to the network 16 via the PAC 14. The base station apparatus 12 prescribes a communication channel, and communicates with the terminal apparatus 10 by allocating the communication channel to the terminal apparatus 10 based on the allocation request sent from the terminal apparatus 10. Here, the communication channel includes a call communication channel and a data communication channel. For example, the call communication channel is a channel assigned periodically, while the data communication channel is a channel assigned when data to be transmitted is generated. When the base station apparatus 12 receives an incoming signal notification sent to the terminal apparatus 10 in the form of a PCH incoming signal message from the PAC 14, the base station apparatus 12 broadcasts a PCH.

The PAC 14 is a control apparatus for managing a paging area. The paging area is an area covering a plurality of base station apparatuses 12 that carry out the simultaneous paging. The paging area may also be defined as an area where a PCH having the same content is transmitted. Though the paging area is formed by two base station apparatuses 12 which are the first base station apparatus 12a and the second base station apparatus 12b, it may be actually formed by more than two base station apparatuses 12. When the terminal apparatus 10 is connected to the base station apparatus 12, the PAC 14 receives from the base station apparatus 12 a request indicating that the position of the terminal apparatus 10 be registered and then registers the position of said terminal apparatus 10. Upon receipt of the incoming signal notification to the terminal apparatus 10, the PAC 14 transmits the PCH incoming signal message to the base station apparatuses 12 locating within the paging area. Such processing is a known art and the description thereof is omitted here.

Based on the notification sent from the base station apparatus 12, the PAC 14 keeps track of connection status between the terminal apparatus 10 and the base station apparatus 12. In particular, the PAC 14 identifies a case when the base station apparatus 12 allocates a data communication channel to the terminal apparatus 10, namely a case when a data communication is in progress between the base station apparatus 12 and the terminal apparatus 10. In such a case, upon receipt of the incoming signal notification the PAC 14 does not generate a PCH incoming signal message but generates a communication channel incoming signal message. The PAC 14 also transmits the communication channel incoming signal message to the base station apparatus 12 which is being connected to the terminal apparatus 10. The base station apparatus 12, which has received the communication channel incoming signal message, has the incoming signal notification included in the data communication channel. The base station apparatus 12 accesses the terminal apparatus 10 by transmitting the data communication channel to the terminal apparatus 10. The subsequent processing is similar to that carried out in the case of calls over a PCH and therefore the repeated description thereof is omitted here.

External communication devices such as the server 18 and telephone set 20 are connected to the PAC 14 through the network 16. For example, the network 16 is constructed on an IP (Internet Protocol) network but the structure thereof should not be considered as limiting. The server 18 performs data communication with the terminal apparatus 10, and is equivalent to a mail server, for instance. The telephone set 20 carries out voice communication with the terminal apparatus 10. It is assumed herein that the telephone set 20 places a call to the terminal apparatus 10. Note that hereinbelow a description concerning the data communication is skipped as appropriate and a description is focused on the case of executing voice communication.

Figure 2:
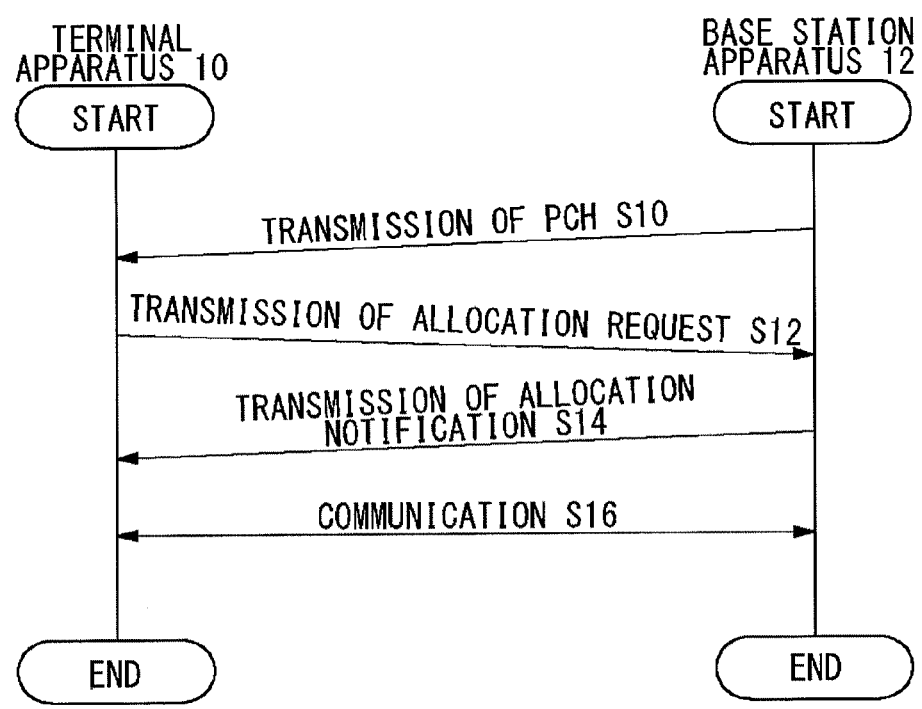
FIG. 2 is a sequence diagram showing a communication procedure performed by a communication system of FIG. 1.

FIG. 2 is a sequence diagram showing a communication procedure performed by the communication system 100 of FIG. 1. A description is herein given of operations in a case where calls are broadcast on the PCH. The terminal apparatus 10 transmits a PCH (S10). The terminal apparatus 10, which has received the PCH, detects that the PCH contains an incoming signal notification addressed to the terminal apparatus 10 itself and transmits an allocation request to the base station apparatus 12 (S12). Upon receipt of the allocation request, the base station apparatus 12 allocates a communication channel, such as a call communication channel, to the terminal apparatus 10. The base station apparatus 12 transmits the allocation request to the terminal apparatus 10 (S14).

The terminal apparatus 10 and the base station apparatus 12 communicate with each other using the allocated communication channel (S16).

Figure 3:
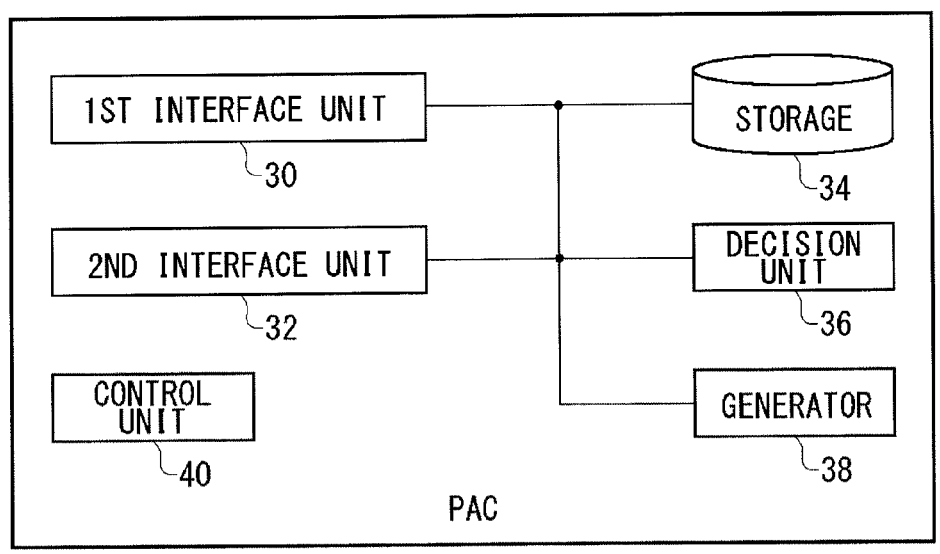
FIG. 3 shows a structure of PAC of FIG. 1.

FIG. 3 shows a structure of the PAC 14. The PAC 14 includes a first interface unit 30, a second interface unit 32, a storage 34, a decision unit 36, a generator 38, and a control unit 40. The first interface unit 30 is an interface interacting with the not-shown network 16. If the network 16 is constructed on the IP network, the first interface unit 30 will perform processing that corresponds to the IP. For example, the first interface unit 30 receives an incoming signal notification addressed to the terminal apparatus 10, from the not-shown telephone set 20. The first interface unit 30 may output the signal received by the second interface unit 32 (described later) to the network 16.

The second interface unit 32 is an interface interacting with not-shown base station apparatuses 12. Note here that a plurality of base station apparatuses 12 are connected to the second interface unit 32 and they form a paging area. The second interface unit 32 outputs the incoming signal notification received by the first interface unit 30, to the base station apparatuses 12 and an operation thereof will be discussed later. The second interface unit 32 receives, from a base station apparatus 12, a request indicating that the position of the terminal apparatus 10 be registered. To register the position, the second interface unit 32 outputs the information on the terminal apparatus 10 and the base station apparatus 12 to the storage 34 wherein the information thereon has been received as part of the request for the registration of the position.

Also, the second interface unit 32 receives, from the base station apparatus 12, information concerning a connection status between the terminal apparatus 10 and the base station apparatus 12 (hereinafter referred to as "connection information"). The connection information includes a voice communication being in progress between the terminal apparatus 10 and the base station apparatus 12 and a data communication being in progress between the terminal apparatus 10 and the base station apparatus 12. The former case corresponds to a call communication channel being established, while the latter case corresponds to a data communication channel being established. Also, the second interface unit 32 outputs the connection information to the storage 34.

The storage 34 stores the status of the terminal apparatus 10. More specifically, information, on the terminal apparatus 10 and the base station apparatus 12, received as the aforementioned request for the registration of the positions, the connection information and so forth are stored. When the first interface unit 30 receives the incoming signal notification, the decision unit 36 determines a format of messages used to convey this fact to the base station apparatus 12. As described above, there are two different kinds of messages; one is PCH incoming signal message and the other is communication channel incoming signal message. The decision unit 36 verifies the status of the terminal apparatus 10 which is a destination, by referencing the storage 34. Note here that the decision unit 36 determines the use of PCH incoming signal message if the data communication channel has not been established between the terminal apparatus 10 and the base station apparatus 12. If, on the other hand, the data communication channel has been established between the terminal apparatus 10 and the base station apparatus 12, the decision unit 36 will determine the use of communication channel incoming signal message. The decision unit 36 informs the generator 38 of the thus determined message format.

The generator 38 generates a PCH incoming signal message or communication channel incoming signal message depending on an instruction given from the decision unit 36. Note that the generator 38 has the incoming signal notification included in either the PCH incoming signal message or communication channel incoming signal message. If the PCH incoming signal message is generated by the generator 38, the second interface unit 32 will output the PCH incoming signal message to a base station apparatus 12 corresponding to the paging area of the terminal apparatus 10. If, on the other hand, the communication channel incoming signal message is generated by the generator 38, the second interface unit 32 will output the communication channel incoming signal message to a base station apparatus 12 which has established a data communication channel with the terminal apparatus 10.

If a call communication channel has been established between the terminal apparatus 10 and the base station apparatus 12, the second interface unit 32 will receive the fact that the call communication channel has been established therebetween, from the base station apparatus 12. If, on the other hand, it does not receive said fact even after a predetermined length of time has been elapsed since the output of communication channel incoming message, the second interface unit 32 will report to the generator 38 accordingly. In such a case, the generator 38 generates a PCH incoming signal message, and the second interface unit 32 outputs the PCH incoming signal message to the base station apparatus 12 corresponding to the paging area of the terminal apparatus 10. The control unit 40 controls the operation of the entire PAC 14.

This structure may be implemented hardwarewise by elements such as a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 4:
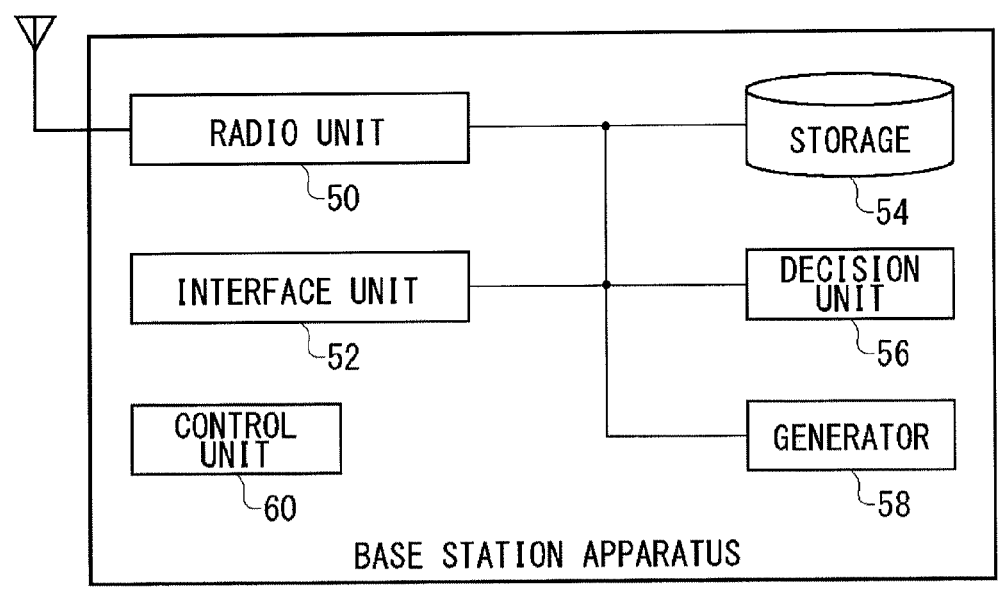
FIG. 4 shows a structure of a base station apparatus of FIG. 1.

FIG. 4 shows a structure of a base station apparatus 12. The base station apparatus 12 includes a radio unit 50, an interface unit 52, a storage 54, a decision unit 56, a generator 58, and a control unit 60. The storage 54 stores the status of the terminal apparatus 10. The status of the terminal apparatus 10 meant here is the state of a communication channel assigned to the terminal apparatus 10, for example, and is equivalent to whether a data communication channel is assigned to the terminal apparatus 10 or not, in particular among others. The interface unit 52 is an interface interacting with the PAC 14. The interface unit 52 performs processing corresponding to that performed by the second interface unit 32 of FIG. 3. Note here that the interface unit 52 receives a PCH incoming signal message or communication channel incoming signal message as the incoming signal notification addressed to the terminal apparatus 10.

The decision unit 56 receives the PCH incoming signal message and the communication channel incoming signal message sent from the PAC 14, and determines the method for transmitting the incoming signal notification to the terminal apparatus 10, based on these messages. More specifically, where the PCH incoming signal message is received, the decision unit 56 determines the broadcasting of PCH as the method for transmitting the incoming signal notification to the terminal apparatus 10. On the other hand, where the communication channel incoming signal message is received, the decision unit 56 determines the transmission of data communication channel as the method for transmitting the incoming signal notification to the terminal apparatus 10. The decision unit 56 outputs the thus determined content to the generator 58. The generator 58 generates a PCH containing the incoming signal notification or a data communication channel containing the incoming signal notification, according to the content determined by the decision unit 56. At the same time, the generator 58 acquires a change in status of the terminal apparatus 10 via the radio unit 50, and also generates a message used to convey the change in status thereof to the PAC 14. The change in status of the terminal apparatus 10 is, for example, that the connection of call communication channel has been completed between the base station apparatus 12 and the terminal apparatus 10. This content is also stored in the storage 54.

The radio unit 50 wirelessly communicates with the terminal apparatus 10. The radio communication scheme used in the communication between the radio unit 50 and the terminal apparatus 10 may be arbitrary. In the present exemplary embodiment, two main channels are defined, which are a communication channel and a control channel. The communication channel is a channel used to transmit data to be communicated, and is divided into a call communication channel and a data communication channel depending on the content of data. On the other hand, the control channel is a channel used to establish or maintain a communication channel, and includes the above-described PCH. Where the PCH is generated by the generator 58, the radio unit 50 broadcasts the PCH. On the other hand, where the data communication channel including the incoming signal notification is generated by the generator 58, namely where the data communication channel has already been assigned to the terminal apparatus 10, the data communication channel is transmitted to the terminal apparatus 10.

Figure 5:
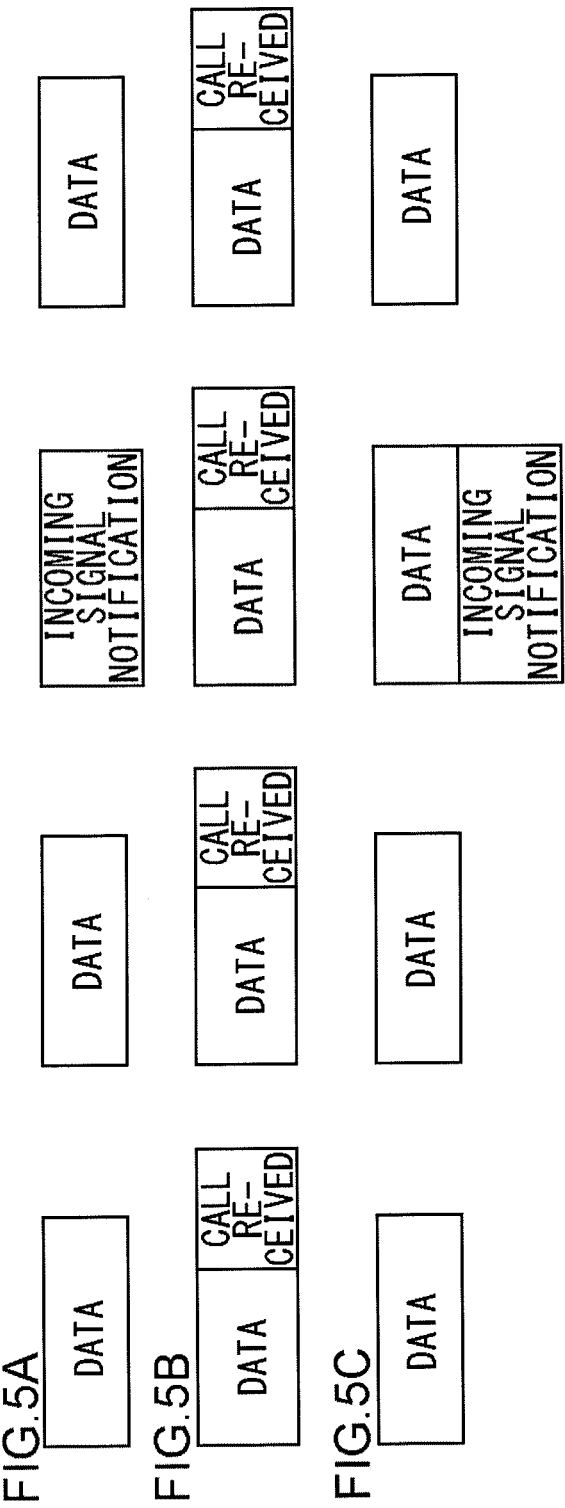
FIGS. 5A to 5C each shows a structure of data communication channel sent from a base station apparatus of FIG. 4.

FIGS. 5A to 5C each shows a structure of data communication channel sent from the base station apparatus 12. FIG. 5A illustrates a case where a plurality of data communication channels are transmitted at predetermined intervals, and the horizontal axis represents time. Channels shown in the left side of Figure correspond to data communication channels transmitted earlier. Here, "Data" are included in the first two data communication channels and the fourth data communication channel, whereas an "incoming signal notification is included in the third data communication channel. In other words, the inclusion of data into the data communication channel is stopped and, instead, the incoming signal notification is included. In FIG. 5B, "Data" and "incoming signal notification" are included, in a mixed manner, in each data communication channel. In FIG. 5C, "Data" is included in each of a plurality of data communication channels, and another data communication channel is newly added and an "incoming signal notification" is included in the added data communication channel. Now, refer back to FIG. 4.

The radio unit 50 receives a response to the transmitted PCH or data communication channel, from the terminal apparatus 10. The response corresponds to a request for allocation of a call communication channel. The radio unit 50 outputs the request for allocation of a call communication channel to the control unit 60. The control unit 60 controls the operation of the entire base station apparatus 12. Also, the control unit 60 allocates the call communication channel to the terminal apparatus 10, based on the received request for allocation of a call communication channel. Further, the control unit 60 outputs an allocation result to the radio unit 50 and the interface unit 52. The radio unit 50 transmits the allocation result to the terminal apparatus 10 as an allocation notification. Then the radio unit 50 communicates with the terminal apparatus 10 using the thus allocated call communication channel. On the other hand, the interface unit 52 outputs the allocation result to the PAC 14.

Figure 6:
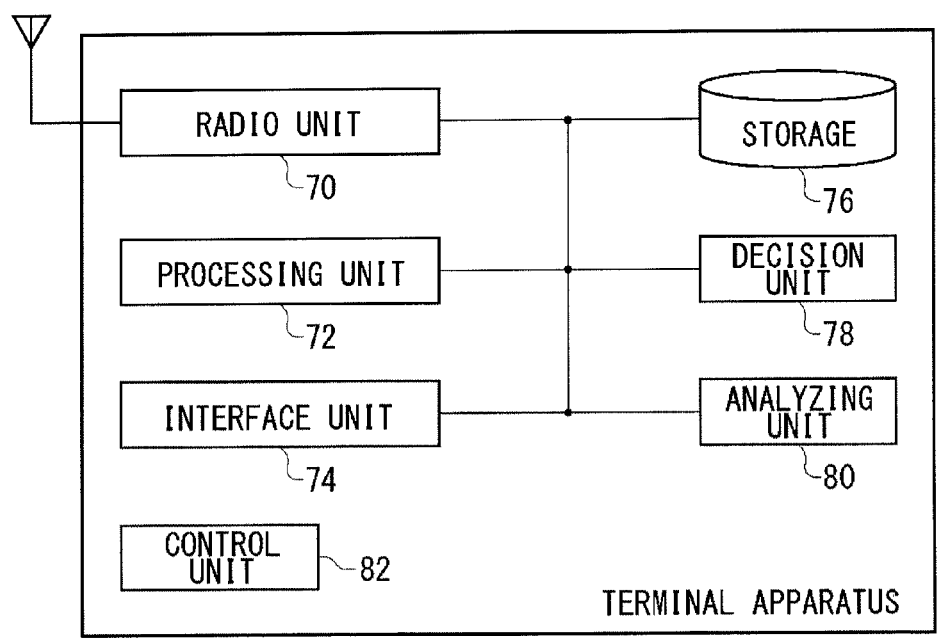
FIG. 6 shows a structure of a terminal apparatus of FIG. 1.

FIG. 6 shows a structure of the terminal apparatus 10. The terminal apparatus 10 includes a radio unit 70, a processing unit 72, an interface unit 74, a storage 76, a decision unit 78, an analyzing unit 80, and a control unit 82. The interface unit 74 receives an input from a user. For example, the interface unit 74 is comprised of buttons and the like, and the pressing of the buttons by the user allows the input of instructions from the user. The processing unit 72 controls the operation of communication applications. The communication applications meant here are a voice communication function, an electronic mail function and the like. Triggered by an instruction inputted to the interface unit 74, the processing unit 72 activates a communication application. The processing unit 72 may automatically activate the communication applications with other timings. The storage 76 stores the current states. The current states include, for example, a state where the data communication channel is assigned, a state where the call communication is assigned, an inactive state, a dormant state, and so forth.

The radio unit 70 wirelessly communicates with the base station apparatus 12. The radio unit 70 performs processing corresponding to that performed by the radio unit 50 of FIG. 4. The radio unit 70 receives a PCH containing the incoming signal notification, from the base station apparatus 12. If a data communication channel has already been assigned from the base station apparatus 12, the radio unit 70 will receive the data communication channel containing the incoming signal notification, from the base station apparatus 12. The radio unit 70 outputs the received PCH or data communication channel to the analyzing unit 80. The analyzing unit 80 detects whether or not an incoming signal notification addressed to the terminal apparatus 10 itself is included in the PCH or data communication channel. If the incoming signal notification addressed thereto is included therein, the radio unit 70 will transmit a response to the received PCH or data communication channel according to the instruction from the interface unit 74, to the base station apparatus 12.

As described above, said response is equivalent to the request for allocation of a call communication channel. After the response is transmitted to the base station apparatus 12, the radio unit 70 receives an allocation notification from the base station apparatus 12. The radio unit 70 communicates with the base station apparatus 12 using the call communication channel assigned. The decision unit 78 determines a change in state. The decision unit 78 detects a change in state of the radio unit 70, and stores its result in the storage 76. The control unit 82 controls the operation of the entire terminal apparatus 10.

Figure 7:
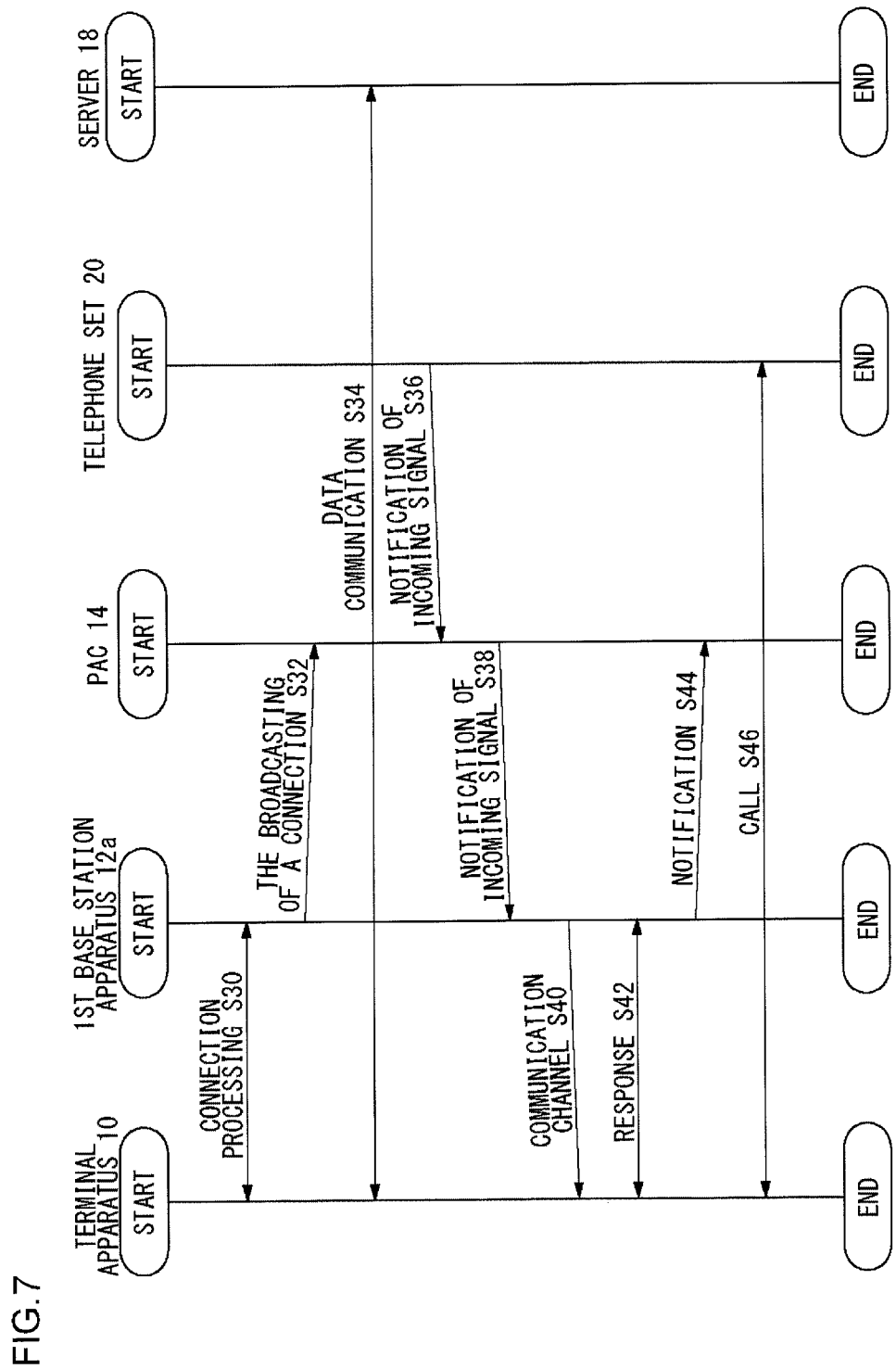
FIG. 7 is a sequence diagram showing a procedure for verbal communication performed by a communication system of FIG. 1.

An operation of the communication system 100 structured as above is now described. FIG. 7 is a sequence diagram showing a procedure for voice communication performed by the communication system 100. The terminal apparatus 10 and the first base station apparatus 12a perform connection processing required for the data communication (S30). The first base station apparatus 12a broadcasts a connection to the PAC 14 (S32). As a result, the data communication is carried out between the terminal apparatus 10 and the server 18 (S34). The PAC 14 receives an incoming signal notification sent from the telephone set (S36). The first base station apparatus 12a receives an incoming signal notification sent from the PAC 14 (S38). The first base station apparatus 12a conveys the incoming signal (call signal) to the terminal apparatus 10 through the data communication channel (S40). The terminal apparatus 10 transmits a response to the first base station apparatus 12a (S42). The first base station apparatus 12a conveys to the PAC 14 indicating that the response has been made (S44). Voice communication is carried out between the terminal apparatus 10 and the telephone set 20 (S46).

Figure 8:
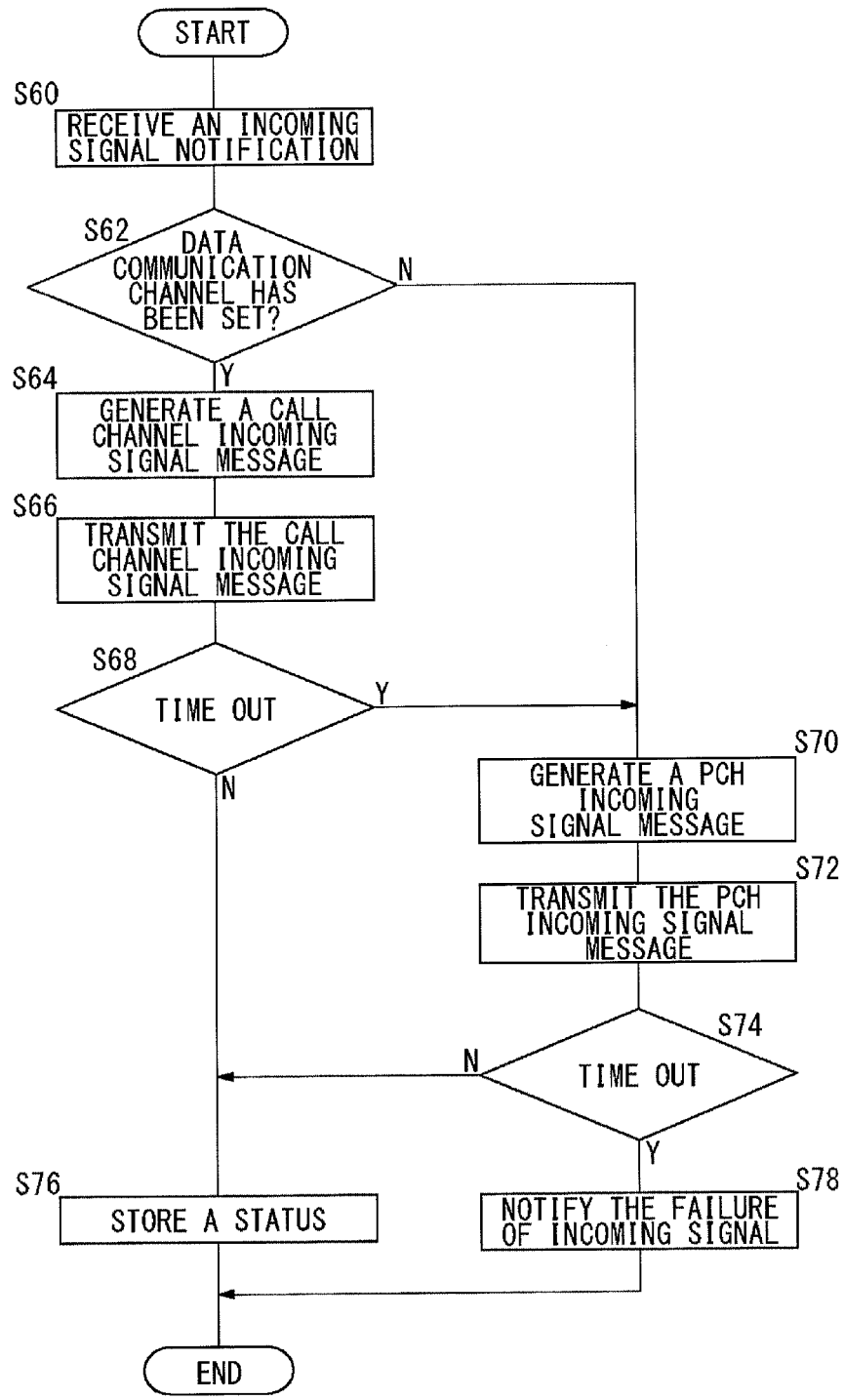
FIG. 8 is a flowchart showing a communication procedure performed by PAC of FIG. 3.

FIG. 8 is a flowchart showing a communication procedure performed by the PAC 14. The first interface unit 30 receives an incoming signal notification (S60). If a data communication channel has already been set (Y of S62), the generator 38 will generate a communication channel incoming signal message (S64). The second interface unit 32 transmits the communication channel incoming signal message (S66). If a time-out has not occurred (N of S68), the storage 34 will store the status of the terminal apparatus 10 (S76). If, on the other hand, the data communication channel has not already been set (N of S62) or a time-out occurs (Y of S68), the generator 38 will generate a PCH incoming signal message (S70). The second interface unit 32 transmits the PCH incoming signal message (S72). If a time-out has not occurred (N of S74), the storage 34 stores the status of the terminal apparatus 10 (S76). If a time-out occurs (Y of S74), the first interface unit 30 will inform the failure of incoming signal (S78).

Figure 9:
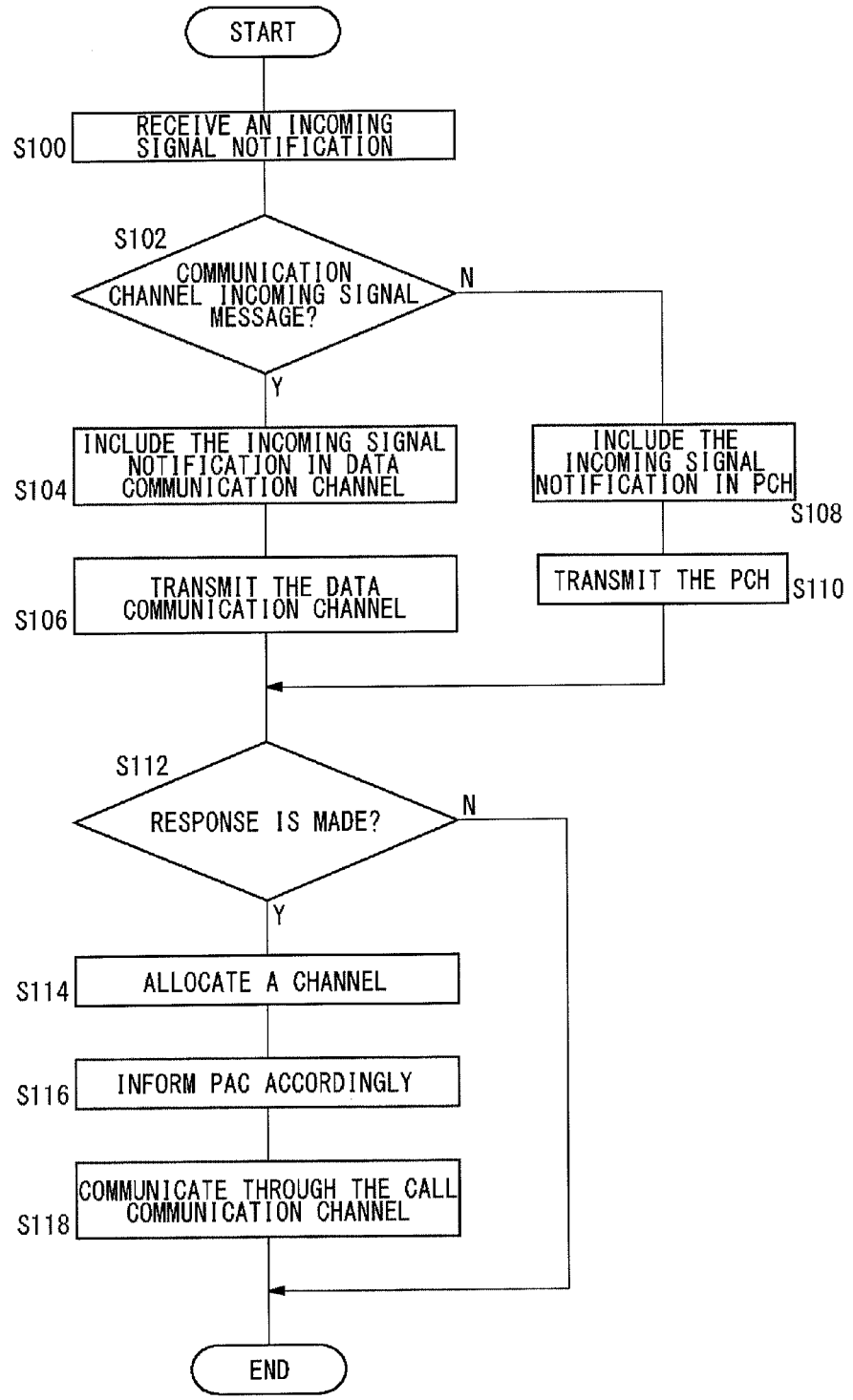
FIG. 9 is a flowchart showing a communication procedure performed by a base station apparatus of FIG. 4.

FIG. 9 is a flowchart showing a communication procedure performed by a base station apparatus 12. The interface unit 52 receives an incoming signal notification (S100). If it is a communication channel incoming signal message (Y of S102), the generator 58 will have the incoming signal notification included in the data communication channel (S104). The radio unit 50 transmits the data communication channel (S106). If it is not the communication channel incoming signal message (N of S102) but a PCH incoming signal message, the generator 58 will have the incoming signal notification included in the PCH (S108). The analyzing unit 80 transmits the PCH (S110).

If a response is received from the terminal apparatus 10 (Y of S112), the control unit 60 will allocate the call communication channel to the terminal apparatus 10 (S114). The interface unit 52 informs the PAC 14 accordingly (S116). The radio unit 50 communicates with the terminal apparatus 10 using the call communication channel (S118). If, on the other hand, no response is received from the terminal apparatus 10 (N of S112), the processing will be terminated.

Figure 10:
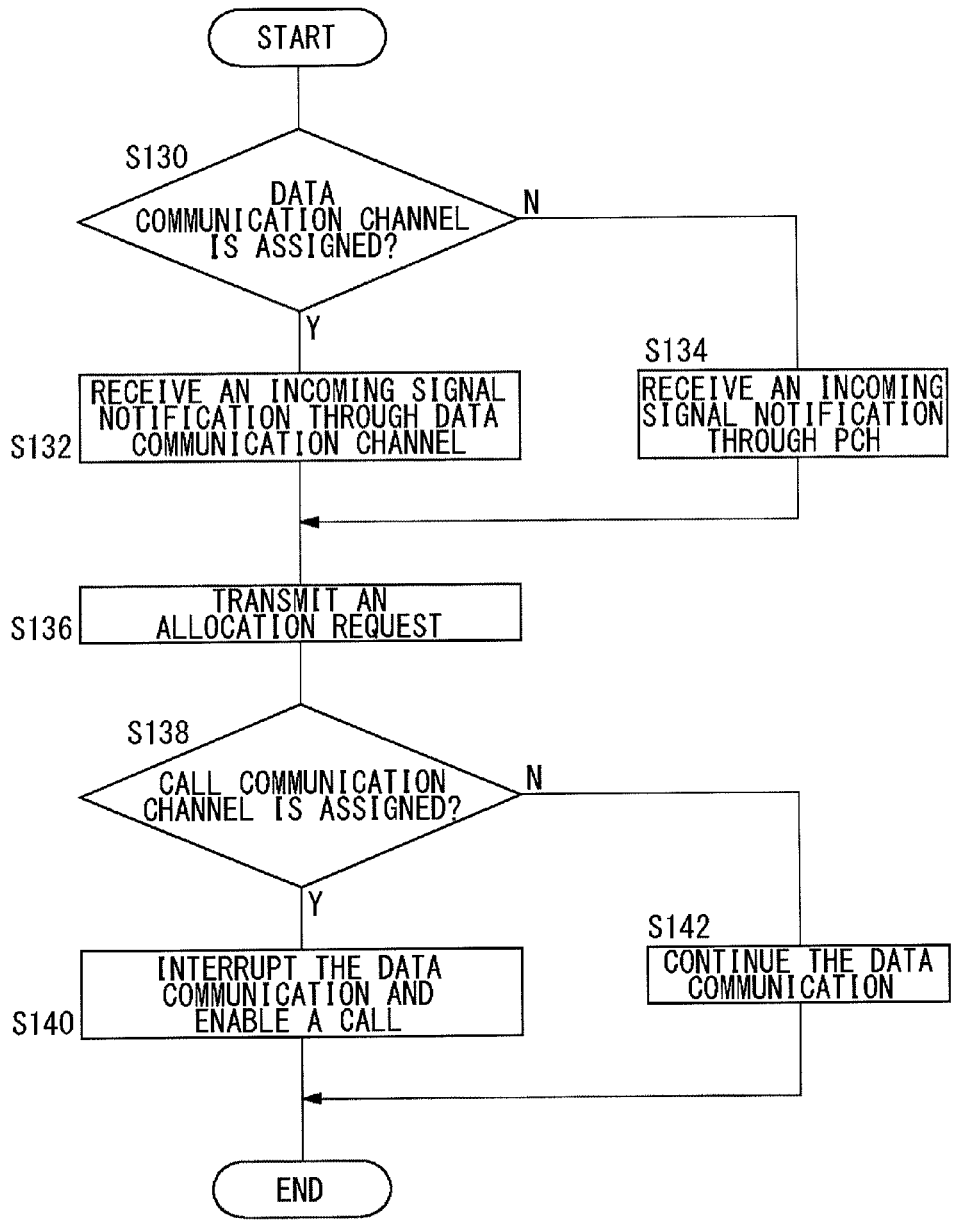
FIG. 10 is a flowchart showing a communication procedure performed by a terminal apparatus of FIG. 6.

FIG. 10 is a flowchart showing a communication procedure performed by the terminal apparatus 10. If a data communication channel is assigned (Y of S130), the radio unit 70 will receive the incoming signal notification from the base station apparatus 12 through the data communication channel (S132). If, on the other hand, the data communication channel is not assigned (N of S130), the radio unit 70 will receive the incoming signal notification from the base station apparatus 12 through the PCH (S134). Also, the radio unit 70 transmits an allocation request to the base station apparatus 12 (S136). If a call communication channel is assigned by the base station apparatus 12 (Y of S138), the radio unit 70 will stop the data communication and carry out voice communication (S140). If, on the other hand, the call communication channel is not assigned (N of S138), the radio unit 70 will continue the data communication (S142).

By employing the exemplary embodiment of the present invention, the incoming signal notification is included in the data communication channel if the data communication channel has been established. Thus, the use of a paging channel can be avoided. Also, since the use of a paging channel is avoided, the frequency usage efficiency can be improved. Also, the data communication channel, which has already been in use, is used, so that the call or access can be promptly conveyed to the terminal apparatus. Also, since the call is promptly conveyed to the terminal apparatus, processing delay can be reduced. Also, since the processing delay is reduced, the user's convenience is enhanced. Also, the paging channel is used if no response is made to the incoming signal notification over the data communication channel, so that an increase in the probability of failure in the incoming signal can be suppressed.

The present invention has been described based on the exemplary embodiment. The exemplary embodiment is intended to be illustrative only, and it is understood by those skilled in the art that various modifications to constituting elements and processes could be developed and that such modifications are also within the scope of the present invention.

In the exemplary embodiment of the present invention, the radio communication scheme used in the communication between the radio unit 50 in the base station apparatus 12 and the radio unit 70 in the terminal apparatus 10 is arbitrary. However, this should not be considered as limiting and, for example, it may be an OFDM scheme. In such a case, ranging processing may be carried out between the terminal apparatus 10 and the base station apparatus 12 before the allocation request is made. According to this modification, the present invention is applicable to various radio schemes.

In the exemplary embodiment of the present invention, the processing carried out after the receipt of the incoming signal notification by the terminal apparatus 10 is the same for both cases where the incoming signal notification is transmitted through the PCH, and a case where the incoming signal notification is transmitted through the data communication channel. However, this should not be considered as limiting and, for example, the processing carried out after the receipt of the incoming signal notification by the terminal apparatus 10 may be different between these two cases. For example, if the incoming signal notification is transmitted through the PCH, authentication processing is carried out between the terminal apparatus 10 and the base station apparatus 12 before the call communication channel is assigned. Also, if the incoming signal notification is transmitted through the data communication channel, no authentication processing is carried out between the terminal apparatus 10 and the base station apparatus 12 before the call communication channel is assigned. In the latter case, authentication processing has already been carried out between the terminal apparatus 10 and the base station apparatus 12 when a call communication channel is to be assigned, and its result will be used. According to this modification, where the incoming signal notification is transmitted through the data communication channel, the connection can be established faster than the case where the incoming signal notification is transmitted through the PCH.

In the exemplary embodiment of the present invention, while the terminal apparatus 10 and the base station apparatus 12 perform data communication with each other, the data communication channel is transmitted at regular intervals. However, this should not be considered as limiting and, for example, a radio link may be established inactively between the terminal apparatus 10 and the base station apparatus 12 though the data communication channel is on and off intermittently. In such a case, the base station apparatus 12 does not carry out the simultaneous paging using the PCH and transmits the incoming signal notification through the data communication channel. Also, the data communication channel may be on and off intermittently and the radio link may not be established in a dormant state between the terminal apparatus 10 and the base station apparatus 12. In such a case, the base station apparatus 12 does not carry out the simultaneous paging using the PCH and transmits the incoming signal notification through the data communication channel after establishing the radio link which is led by the base station apparatus 12. According to this modification, the chance of avoiding the incoming signal notification using the PCH can be increased.

In the exemplary embodiment of the present invention, a device connected to a plurality of base station apparatuses 12 is the PAC 14. However, this should not be considered as limiting and, for example, it may be a gateway of a communication carrier or a relay server that determines the routes of the communication carrier, instead. According to this modification, the present invention is applicable to various equipment.

INDUSTRIAL APPLICABILITY

The present invention improves the use efficiency of frequency and at the same time conveys promptly the incoming signal to the terminal apparatus.

What is claimed is:

1. A control apparatus, comprising:
an input unit configured to receive an incoming signal notification addressed to a terminal apparatus;
a generator configured to generate a first message used to have the incoming signal notification received by said input unit included in a paging channel; and
an output unit configured to output the first message generated by said generator to a base station apparatus corresponding to a paging area of the terminal apparatus,
wherein said input unit receives, from the base station apparatus, connection information indicating that a communication channel for data communication is established between the terminal apparatus and the base station apparatus,
wherein when the connection information is received, said generator generates a second message used to have the incoming signal notification included in the communication channel, and
wherein said output unit outputs the second message generated by said generator, to the base station apparatus which establishes the communication channel with the terminal, and outputs the first message to the base station apparatus corresponding to the paging area of the terminal apparatus when the base station apparatus has not received a response to the incoming signal notification based on the second message from the terminal apparatus.

2. A control apparatus according to claim 1, wherein when the base station apparatus has not received a response to the incoming signal notification from the terminal apparatus after the second message is outputted and a predetermined time period has elapsed, said output unit outputs the first message.

3. A base station apparatus, comprising:
an input unit configured to receive an incoming signal notification addressed to a terminal apparatus;
a transmitter configured to have the incoming signal notification received by said input unit included in a paging channel and configured to transmit the paging channel;
a receiver configured to receive a response to the paging channel transmitted by said transmitter, from the terminal apparatus, the response corresponding to a request for allocation of a call communication channel; and
a control unit configured to allocate the call communication channel to the terminal apparatus, based on the response received by said receiver,
wherein when said control unit allocates a data communication channel to said transmitter, said transmitter has the incoming signal notification included in the data communication channel and transmits the data communication channel to the terminal apparatus,
wherein said receiver receives a response to the data communication channel transmitted by said transmitter, from the terminal apparatus, the response corresponding to a request for allocation of the call communication channel, and
wherein, when the said receiver has not received, from the terminal apparatus, the response to the data communication channel, the response corresponding to a request for allocation of the communication channel, said input unit receives the incoming signal notification addressed to the terminal apparatus, and said transmitter has the incoming signal notification included in the paging channel and transmits the paging channel.

4. A terminal apparatus, comprising:
a receiver configured to receive a paging channel containing an incoming signal notification from a base station apparatus;
a request unit configured to transmit a response to the paging channel received by said receiver, to the base station apparatus, the response corresponding to a call communication channel; and
a communication unit configured to perform communication with the base station using the call communication channel allocated by the base station apparatus to which said request unit has transmitted the response,
wherein when a data communication channel is assigned from said receiving unit, said receiver receives the data communication channel containing the incoming signal notification from the base station apparatus,
wherein said request unit transmits a response to the data communication channel received by said receiver, to the base station apparatus, the response corresponding to a request for allocation of the call communication channel,
wherein, when the response to the data communication channel, the response corresponding to a request for allocation of the communication channel, has not been received by said base station apparatus, a paging channel including an incoming call notification is transmitted from a plurality of base station apparatuses corresponding to a paging area that includes said base station apparatus.

5. A communication method, comprising:
receiving an incoming signal notification addressed to a terminal apparatus;
generating a first message used to have the incoming signal notification received by said receiving included in a paging channel; and
outputting the first message generated by said generating to a base station apparatus corresponding to a paging area of the terminal apparatus,
wherein when connection information indicating that a communication channel for data communication is established between the terminal apparatus and the base station apparatus is received from the base station apparatus, said generating is such that a second message used to have the incoming signal notification included in the communication channel is generated, and
wherein said outputting is such that the generated second message is outputted to the base station apparatus which establishes the communication channel with the terminal, and outputs the first message to the base station apparatus corresponding to the paging area of the terminal apparatus when the base station apparatus has not received a response to the incoming signal notification based on the second message from the terminal apparatus.

6. A communication method, comprising:
receiving an incoming signal notification addressed to a terminal apparatus;
having the received incoming signal notification included in a paging channel and transmitting the paging channel;
receiving a response to the transmitted paging channel, from the terminal apparatus, the response corresponding to a request for allocation of a call communication channel; and
allocating the call communication channel to the terminal apparatus, based on the received response,
wherein when a data communication channel is assigned to the terminal apparatus, said transmitting is such that the incoming signal notification is included in the data communication channel and the data communication channel is transmitted to the terminal apparatus,
wherein said receiving is such that a response to the transmitted data communication channel is received from the terminal apparatus, the response corresponding to a request for allocation of the call communication channel, and
wherein the communication method further comprising:
when the response to the data communication channel, the response corresponding to a request for allocation of the communication channel, has not been received from the terminal apparatus, including the received incoming signal notification addressed to the terminal apparatus in the paging channel and transmitting the paging channel.

7. A communication method, comprising:
receiving a paging channel containing an incoming signal notification, from a base station apparatus;
transmitting a response to the received paging channel, to the base station apparatus, the response corresponding to a request for allocation of a call communication channel; and
performing communication with the base station apparatus by using the communication channel allocated by the base station apparatus which has transmitted the response,
wherein when a data communication channel is assigned from the base station apparatus, said receiving is such that the data communication channel containing the incoming signal notification is received from the base station apparatus,
wherein said transmitting is such that a response to the received data communication channel is transmitted to the base station apparatus, the response corresponding to a request for allocation of the call communication channel, and
wherein, when the response to the data communication channel, the response corresponding to a request for allocation of the communication channel, has not been received by said base station apparatus, paging channel including an incoming call notification is transmitted from a plurality of base station apparatuses corresponding to a paging area that includes said base station apparatus.

* * * * *